United States Patent
Paolucci et al.

(10) Patent No.: US 11,598,213 B1
(45) Date of Patent: Mar. 7, 2023

(54) ROTOR ASSEMBLY FOR A GAS TURBINE ENGINE AND METHOD FOR ASSEMBLING SAME

(71) Applicant: Pratt & Whitney Canada Corp., Longueuil (CA)

(72) Inventors: Michael Paolucci, Kirkland (CA); Franco Di Paola, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/497,458

(22) Filed: Oct. 8, 2021

(51) Int. Cl.
| | | |
|---|---|---|
| *F01D 5/06* | (2006.01) | |
| *F01D 5/02* | (2006.01) | |
| *F04D 29/054* | (2006.01) | |
| *F01D 5/30* | (2006.01) | |

(52) U.S. Cl.
CPC .............. *F01D 5/06* (2013.01); *F01D 5/026* (2013.01); *F01D 5/066* (2013.01); *F04D 29/054* (2013.01); *F05D 2230/60* (2013.01); *F05D 2240/24* (2013.01); *F05D 2240/60* (2013.01)

(58) Field of Classification Search
CPC . F01D 5/06; F01D 5/066; F01D 5/026; F04D 29/054
See application file for complete search history.

(56) References Cited

U.S. PATENT DOCUMENTS

| | | | | |
|---|---|---|---|---|
| 4,193,741 A | * | 3/1980 | Briggs | F02C 7/04 416/174 |
| 8,186,903 B2 | * | 5/2012 | Makin | F01D 5/026 403/353 |
| 10,428,690 B2 | | 10/2019 | Juh | |
| 2007/0101696 A1 | * | 5/2007 | Dooley | F02C 1/04 60/204 |
| 2013/0323077 A1 | * | 12/2013 | Giannakopoulos | F01D 5/025 416/93 R |
| 2018/0334907 A1 | * | 11/2018 | Perrier | F04D 29/054 |
| 2020/0392849 A1 | | 12/2020 | Di Paola | |
| 2021/0017880 A1 | | 1/2021 | Trappier | |

FOREIGN PATENT DOCUMENTS

BE    1025131 B1 * 11/2018

OTHER PUBLICATIONS

Peeters, BE1025131 translation, Nov. 8, 2018 (Year: 2018).*

* cited by examiner

*Primary Examiner* — Richard A Edgar
*Assistant Examiner* — Michael K. Reitz
(74) *Attorney, Agent, or Firm* — Getz Balich LLC

(57) ABSTRACT

A rotor assembly for a gas turbine engine includes a turbine shaft disposed about a longitudinal axis, a first rotor and a second rotor configured for rotation about the longitudinal axis, and an intermediate shaft positioned radially between the turbine shaft and the second rotor. The second rotor is mounted to and axially adjacent the first rotor. The intermediate shaft is mounted to the turbine shaft on an inner radial side of the intermediate shaft. The intermediate shaft is mounted to the second rotor on an outer radial side of the intermediate shaft.

17 Claims, 2 Drawing Sheets

ROTOR ASSEMBLY FOR A GAS TURBINE ENGINE AND METHOD FOR ASSEMBLING SAME

TECHNICAL FIELD

This disclosure relates generally to gas turbine engines and more particularly to rotor assemblies for gas turbine engines.

BACKGROUND OF THE ART

Gas turbine engines, such as those used for aircraft propulsion, may include turbine rotor assemblies which can be attached together and stacked in series axially along a turbine shaft. The use of conventional attachment mechanisms for assembling such rotor assemblies can sometimes result in rotor assemblies having significant axial length and weight. Additionally, rotor assemblies may be directly coupled to the turbine shaft which can make manufacturing of rotor assembly mating features more difficult and can complicate connection of rotor assembly components. Accordingly, there is a need for improved turbine rotor assemblies.

SUMMARY

It should be understood that any or all of the features or embodiments described herein can be used or combined in any combination with each and every other feature or embodiment described herein unless expressly noted otherwise.

According to an aspect of the present disclosure, a rotor assembly for a gas turbine engine includes a turbine shaft disposed about a longitudinal axis, a first rotor and a second rotor configured for rotation about the longitudinal axis, and an intermediate shaft positioned radially between the turbine shaft and the second rotor. The second rotor is mounted to and axially adjacent the first rotor. The intermediate shaft is mounted to the turbine shaft on an inner radial side of the intermediate shaft. The intermediate shaft is mounted to the second rotor on an outer radial side of the intermediate shaft.

In any of the aspects or embodiments described above and herein, the rotor assembly may further include a nut threadably engaged with the intermediate shaft and the first rotor may contact and be mounted between the nut and the second rotor.

In any of the aspects or embodiments described above and herein, the first rotor may define a rotor bore radially inward of the first rotor and the nut may be disposed within the rotor bore.

In any of the aspects or embodiments described above and herein, the first rotor may include an appendage having a radial appendage portion and an axial appendage portion and the radial appendage portion may be mounted between the nut and the second rotor such that the first rotor is axially fixed relative to the second rotor.

In any of the aspects or embodiments described above and herein, the axial appendage portion may be mounted to the second rotor such that the first rotor is rotationally fixed relative to the second rotor.

In any of the aspects or embodiments described above and herein, the intermediate shaft may include at least one bearing assembly mounted on the outer radial side of the intermediate shaft.

In any of the aspects or embodiments described above and herein, a first bearing assembly of the at least one bearing assembly may be mounted to the intermediate shaft axially aft of the second rotor.

In any of the aspects or embodiments described above and herein, the first bearing assembly may contact the second rotor at an aft axial end of the second rotor.

In any of the aspects or embodiments described above and herein, the turbine shaft and the intermediate shaft may define a first splined connection including first external splines of the turbine shaft engaged with first internal splines of the intermediate shaft.

In any of the aspects or embodiments described above and herein, the intermediate shaft and the second rotor may define a second splined connection including second external splines of the intermediate shaft engaged with second internal splines of the second rotor.

In any of the aspects or embodiments described above and herein, the first splined connection may axially overlap the second splined connection.

In any of the aspects or embodiments described above and herein, each of the first rotor and the second rotor may include at least one bladed disk.

According to another aspect of the present disclosure, a gas turbine engine includes a high-pressure shaft disposed about a longitudinal axis of the gas turbine engine and a low-pressure shaft which is coaxially disposed with the high-pressure shaft about the longitudinal axis. The gas turbine engine further includes a first rotor and a second rotor configured for rotation about the longitudinal axis and an intermediate shaft positioned radially between the low-pressure shaft and the second rotor. The second rotor is mounted to and axially adjacent the first rotor. The intermediate shaft is mounted to the low-pressure shaft on an inner radial side of the intermediate shaft and mounted to the second rotor on an outer radial side of the intermediate shaft.

In any of the aspects or embodiments described above and herein, the gas turbine engine may further include a nut threadably engaged with the intermediate shaft and the first rotor may contact and be mounted between the nut and the second rotor.

In any of the aspects or embodiments described above and herein, the first rotor may define a rotor bore radially inward of the first rotor and the nut may be disposed within the rotor bore.

In any of the aspects or embodiments described above and herein, the intermediate shaft may include at least one bearing assembly mounted on the outer radial side of the intermediate shaft.

In any of the aspects or embodiments described above and herein, each of the first rotor and the second rotor may include at least one bladed disk.

According to another aspect of the present disclosure, a method for assembling a rotor assembly for a gas turbine engine includes mounting an intermediate shaft to a turbine shaft disposed about a longitudinal axis by axially inserting the intermediate shaft relative to the turbine shaft with an inner radial side of the intermediate shaft mounted to the turbine shaft. The method further includes mounting a second rotor to the intermediate shaft by axially inserting the second rotor relative to the intermediate shaft with an outer radial side of the intermediate shaft mounted to the second rotor. The method further includes mounting a first rotor to the second rotor with the first rotor axially adjacent the second rotor.

In any of the aspects or embodiments described above and herein, the method may further include threadably engaging a nut with the intermediate shaft to axially fix the first rotor between the nut and the second rotor with the nut disposed within a rotor bore defined radially inward of the first rotor.

In any of the aspects or embodiments described above and herein, the intermediate shaft may include at least one bearing assembly mounted on the outer radial side of the intermediate shaft.

The present disclosure, and all its aspects, embodiments and advantages associated therewith will become more readily apparent in view of the detailed description provided below, including the accompanying drawings.

DETAILED DESCRIPTION

The present disclosure relates to rotor assemblies of gas turbine engines and methods for assembling such rotor assemblies. In some embodiments, the assemblies and methods disclosed herein may facilitate more axially compact arrangements of rotor assemblies compared to existing arrangements. In some embodiments, the assemblies and methods disclosed herein may additionally provide improved rotor stability for the rotor assemblies. In some embodiments, the present disclosure configuration of rotor assemblies may also provide improved tool access for manufacturing and assembling the rotor assemblies.

Figure 1:
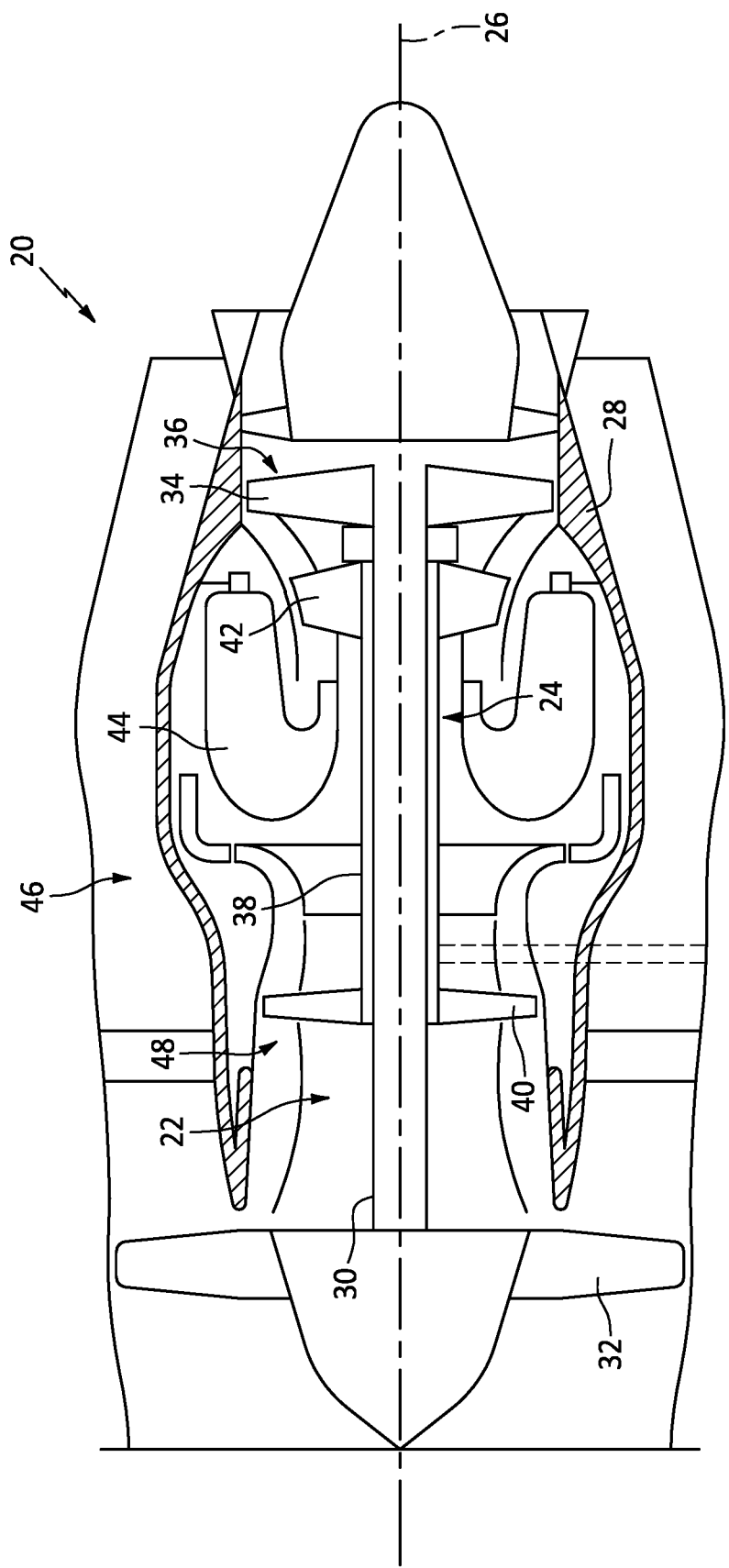
FIG. 1 illustrates a side cross-sectional view of a gas turbine engine, in accordance with one or more embodiments of the present disclosure.

Referring to FIG. 1, an exemplary gas turbine engine 20 is schematically illustrated. The gas turbine engine 20 is disclosed herein as a two-spool engine which generally includes a low-pressure spool 22 and a high-pressure spool 24 mounted for rotation about a longitudinal axis 26 of the gas turbine engine 20, relative to an engine static structure 28, via one or more bearing systems. Although depicted as a turbofan gas turbine engine, it should be understood that the concepts described herein are not limited to use with turbofans or even to gas turbine engines, as the teachings may be applied to other types of turbine engines or to other types of aircraft engines such as rotary engines. Additionally, it is further contemplated that aspects of the present disclosure may be applied to other engines (e.g., gas turbine engines) or industrial equipment which are not associated with aircraft or with the aerospace field, in general.

The low-pressure spool 22 generally includes a low-pressure shaft 30 that interconnects at least a fan 32 and a low-pressure turbine 34. The low-pressure turbine 34 is located within a turbine section 36 of the gas turbine engine 20. In some embodiments, the low-pressure shaft may further interconnect a compressor such as, for example, a low-pressure compressor (not shown). The low-pressure shaft 30 may connected to the fan 32 through a gear assembly to drive the fan 32 at a lower speed than the low-pressure spool 22. The high-pressure spool 24 generally includes a high-pressure shaft 38 that interconnects a compressor 40 (e.g., a high-pressure compressor) and a high-pressure turbine 42. The high-pressure turbine 42 is located within the turbine section 36 of the gas turbine engine 20. It should be understood that "low pressure" and "high pressure" or variations thereof, as used herein, are relative terms indicating that the high pressure is greater than the low pressure. An annular combustor 44 is disposed between the compressor 40 and the high-pressure turbine 42 along the longitudinal axis 26. The low-pressure shaft 30 and the high-pressure shaft 38 are concentric and rotate via the one or more bearing systems about the longitudinal axis 26.

In an exemplary operation of the gas turbine engine 20, the fan 32 may drive air along a bypass flow path 46 and a core flow path 48. The compressor 40 may further drive air along the core flow path 48 for compression and communication into the combustor 44. In the combustor 44, the compressed air may be mixed with fuel and ignited for generating an annular stream of hot combustion gases. The energy of the combustion gases may then be extracted by the low-pressure turbine 34 and the high-pressure turbine 42 of the turbine section 36 for driving the low-pressure spool 22 and the high-pressure spool 24, respectively.

Figure 2:
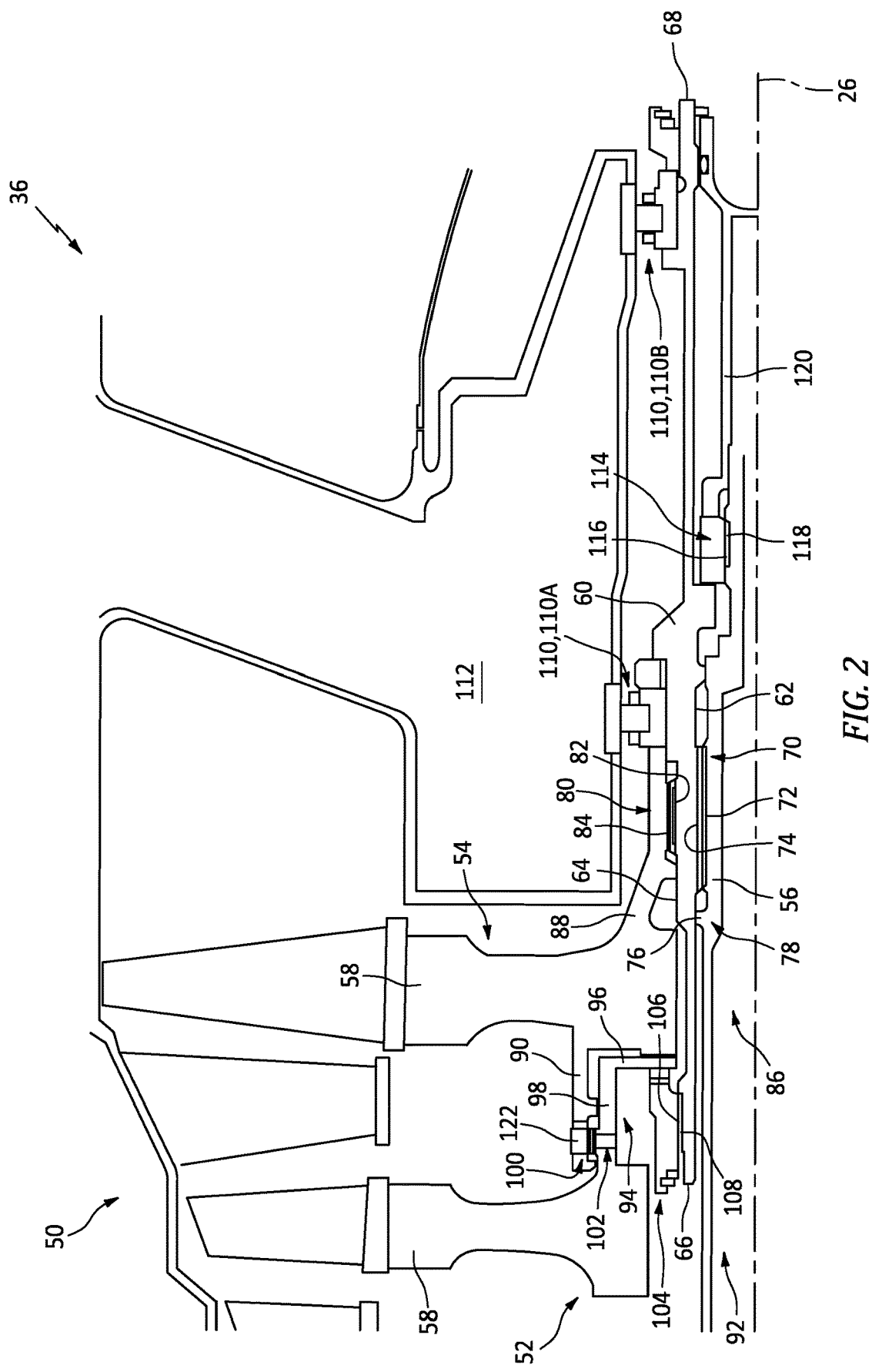
FIG. 2 illustrates side cross-sectional view of a portion of a turbine section of the gas turbine engine of FIG. 1, in accordance with one or more embodiments of the present disclosure.

Referring to FIG. 2, a cross-sectional view of a portion of the turbine section 36 is illustrated. The turbine section 36 includes a rotor assembly 50 including first rotor 52, a second rotor 54 configured for rotation about the longitudinal axis 26. The rotor assembly 50 further includes a power turbine shaft 56 (hereinafter "turbine shaft") which may be defined, for example, by all or a portion of the low-pressure shaft 30 (see FIG. 1). Aspects of the present disclosure rotor assembly 50, however, are not limited to the low-pressure shaft 30 and may be applicable to other shafts, such as the high-pressure shaft 38, which are configured to have torque transmitted thereto by one or more rotors. Further, aspects of the present disclosure rotor assembly 50 may be applicable to other shaft and rotor assemblies which are not part of the turbine section 36 of the gas turbine engine 20 such as, but not limited to, a compressor such as the compressor 40. Each of the first rotor 52 and the second rotor 54 may include one or more bladed disks 58 which may be rotatably driven by the flow of combustion gases through the turbine section 36, as described above.

The rotor assembly 50 includes an annular intermediate shaft 60 radially surrounding the turbine shaft 56. For example, the intermediate shaft 60 may be positioned radially between the turbine shaft 56 and the second rotor 54. The intermediate shaft 60 includes an inner radial side 62 and an outer radial side 64 opposite the inner radial side 62. The intermediate shaft 60 further includes a first axial end 66 (e.g., a forward axial end) and a second axial end 68 (e.g., an aft axial end) opposite the first axial end 66.

The intermediate shaft 60 is mounted to the turbine shaft 56 on the inner radial side 62 of the intermediate shaft 60. The turbine shaft 56 and the intermediate shaft 60 may define a first splined connection 70 including external splines 72 of turbine shaft 56 engaged with internal splines 74 of the intermediate shaft 60. As shown in FIG. 2, for example, the turbine shaft 56 may include a spigot 76 which projects radially outward from the turbine shaft 56 and contacts the inner radial side 62 of the intermediate shaft 60 to define a spigot fit 78 (e.g., an interference fit) between the turbine shaft 56 and the intermediate shaft 60. The spigot 76 may be located axially forward of the first splined connection 70, as shown in FIG. 2. In some embodiments, the intermediate shaft 60 may alternatively include the spigot 76 which may project radially inward from the intermediate shaft 60 and contact the turbine shaft 56.

The second rotor 54 is drivingly connected to the turbine shaft 56 via the intermediate shaft 60. Accordingly, the intermediate shaft 60 is mounted to the second rotor 54 on the outer radial side 64 of the intermediate shaft 60. The second rotor 54 and the intermediate shaft 60 may define a second splined connection 80 including external splines 82 of the intermediate shaft 60 engaged with internal splines 74 of the second rotor 54. In some embodiments, the first splined connection 70 may axially overlap the second splined connection 80. However, the present disclosure is not limited to any axial overlap between the first splined connection 70 and the second splined connection 80.

The second rotor 54 defines a second rotor bore 86 radially inside of the second rotor 54. In some embodiments, the second rotor 54 may include an axially extending first appendage 88. The first appendage 88 may extend, for example, in an aftward direction. The first appendage 88 may have an annular configuration or may include a plurality of circumferential segments. The first appendage 88 may include the internal splines 74 of the second rotor 54, thereby mounting the second rotor 54 to the intermediate shaft 60 via the second splined connection 80. In some embodiments, the second rotor 54 may include an axially extending second appendage 90. The second appendage 90 may extend in a direction toward the first rotor 52, for example, in a forward direction. The second appendage 90 may have an annular configuration or may include a plurality of circumferential segments. In some embodiments, the second appendage 90 may include one or more radially extending apertures 100 formed through the second appendage 90 and configured to permit engagement between the first rotor 52 and the second rotor 54, as will be discussed in further detail.

The first rotor 52 defines a first rotor bore 92 radially inside of the first rotor 52. The first rotor 52 includes a third appendage 94 extending in a direction toward the second rotor 54. In some embodiments, the third appendage 94 may include a radial appendage portion 96 and an axial appendage portion 98. The axial appendage portion 98 may extend in a substantially axial direction. The axial appendage portion 98 may include one or more radially extending apertures 102 configured for alignment with the one or more apertures 100 of the second appendage 90 of the second rotor 54. A pin 122 may extend through each respectively aligned apertures of the one or more apertures 100, 102 in order to rotationally fix the first rotor 52 relative to the second rotor 54 (e.g., to prevent relative rotation between the first rotor 52 and the second rotor 54). However, the present disclosure is not limited to the above-described configuration of the apertures 100, 102 and pins 122 and other means of anti-rotation may be contemplated such as, for example, a splined connection between the first rotor 52 and the second rotor 54. The radial appendage portion 96 may extend in a substantially radial direction from the axial appendage portion 98, for example, in a radially inward direction. The radial appendage portion 96 and/or the axial appendage portion 98 of the third appendage 94 may have an annular configuration or may include a plurality of circumferential segments.

The rotor assembly 50 further includes a nut 104 threadably engaged with the intermediate shaft 60 for axially clamping the first rotor 52 and the second rotor 54 together. The nut 104 may include threads 106 formed on the nut 104 and configured for threadable engagement with complementary threads 108 of the intermediate shaft 60 such that the nut 104 may be threadably engaged with the intermediate shaft 60 and torqued to a suitable preload. As shown in FIG. 2, the nut 104 may be engaged with the intermediate shaft 60 so that the first rotor contacts and is mounted between the nut 104 and the second rotor 54. In some embodiments, the radial appendage portion 96 of the third appendage 94 of the first rotor 52 may contact and be mounted between the nut 104 and the second rotor 54 so that the first rotor 52 is axially fixed relative to the second rotor 54. The intermediate shaft 60 may extend in an axially forward direction such that the first axial end 66 of the intermediate shaft 60 is located within or axially forward of the first rotor bore 92 defined by the first rotor 54. As shown in FIG. 2, the nut 104 may be located within the first rotor bore 92, thereby providing easier access for installation and removal of the nut 104. Further, the location of the nut 104 within the first rotor bore 92 may result in a decrease in axial length of the rotor assembly 50, for example, in comparison to rotor assembly configurations having a nut or other axial fixing means located at an axially forward end of the rotor assembly. The reduction in axial length of the rotor assembly 50 may additionally provide a reduction in rotor assembly 50 weight.

In some embodiments, the intermediate shaft 60 includes at least one bearing assembly 110 mounted on the outer radial side 64 of the intermediate shaft 60 to provide rotational support to the turbine shaft 56 via the intermediate shaft 60. The use of the intermediate shaft 60, in comparison to a rotor assembly having rotors and bearings directly mounted to a turbine shaft, results in improved rotor dynamic stability of the rotor assembly 50 by decoupling the bearing assembly 110 stiffness from the turbine shaft 56. The use of the intermediate shaft 60 may additionally facilitate improved assembly and manufacturing of the rotor assembly 50 components.

In one example, as shown in FIG. 2, the intermediate shaft 60 may include a first bearing assembly 110A and a second bearing assembly 110B axially spaced from the first bearing assembly 110A. The present disclosure, however, is not limited to any particular number of bearing assemblies of the at least one bearing assembly 110. The at least one bearing assembly 110 may be configured to interface with a case or bearing compartment (e.g., bearing compartment 112) of the turbine section 36 of the gas turbine engine 20. The at least one bearing assembly 110 may be mounted to the intermediate shaft 60 axially opposite the first splined connection 70 from the first rotor 52 and the second rotor 54. For example, the at least one bearing assembly 110 may be mounted to the intermediate shaft 60 axially aft of the first splined connection 70. As shown in FIG. 2, in some embodiments, the at least one bearing assembly 110 (e.g., the first bearing assembly 110A) may contact the second rotor 54 at an aft axial end of the second rotor 54, thereby axially fixing the first rotor 52 and the second rotor 54 relative to the intermediate shaft 60.

In some embodiments, the rotor assembly 50 may further include a nut 114 threadably engaged with the turbine shaft 56 for axially retaining the intermediate shaft 60 relative to the turbine shaft 56. The nut 114 may include threads 116 formed on the nut 114 and configured for threadable engagement with complementary threads 118 of the turbine shaft 56 such that the nut 114 may be threadably engaged with the turbine shaft 56 and torqued to a suitable preload. In some embodiments, the rotor assembly 50 may further include a locking shaft 120 mounted to an axially aft portion of the turbine shaft 56 and/or a portion of the intermediate shaft 60 and may contact the nut 114. Accordingly, the locking shaft 120 may provide anti-rotation functionality for the nut 114 to ensure that the intermediate shaft 60 is securely retained with respect to the turbine shaft 56.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A rotor assembly for a gas turbine engine, the rotor assembly comprising:
   a turbine shaft disposed about a longitudinal axis;
   a first rotor configured for rotation about the longitudinal axis;
   a second rotor mounted to and axially adjacent the first rotor and configured for rotation about the longitudinal axis; and
   an intermediate shaft positioned radially between the turbine shaft and the second rotor, the intermediate shaft mounted to the turbine shaft on an inner radial side of the intermediate shaft and mounted to the second rotor on an outer radial side of the intermediate shaft, the intermediate shaft including at least one bearing assembly mounted on the outer radial side of the intermediate shaft, a first bearing assembly of the at least one bearing assembly mounted to the intermediate shaft axially aft of the second rotor, the first bearing assembly contacting the second rotor at an aft axial end of the second rotor.

2. The rotor assembly of claim 1, further comprising a nut threadably engaged with the intermediate shaft, wherein the first rotor contacts and is mounted between the nut and the second rotor.

3. The rotor assembly of claim 2, wherein the first rotor defines a rotor bore radially inward of the first rotor and the nut is disposed within the rotor bore.

4. The rotor assembly of claim 2, wherein the first rotor includes an appendage having a radial appendage portion and an axial appendage portion and wherein the radial appendage portion is mounted between the nut and the second rotor such that the first rotor is axially fixed relative to the second rotor.

5. The rotor assembly of claim 4, wherein the axial appendage portion is mounted to the second rotor such that the first rotor is rotationally fixed relative to the second rotor.

6. The rotor assembly of claim 1, wherein the turbine shaft and the intermediate shaft define a first splined connection comprising first external splines of the turbine shaft engaged with first internal splines of the intermediate shaft.

7. The rotor assembly of claim 6, wherein the intermediate shaft and the second rotor define a second splined connection comprising second external splines of the intermediate shaft engaged with second internal splines of the second rotor.

8. The rotor assembly of claim 7, wherein the first splined connection axially overlaps the second splined connection.

9. The rotor assembly of claim 1, wherein each of the first rotor and the second rotor include at least one bladed disk.

10. A method for assembling a rotor assembly for a gas turbine engine, the method comprising:
   mounting an intermediate shaft to a turbine shaft disposed about a longitudinal axis by axially inserting the intermediate shaft relative to the turbine shaft with an inner radial side of the intermediate shaft mounted to the turbine shaft to form a first splined connection;
   mounting a second rotor to the intermediate shaft by axially inserting the second rotor relative to the intermediate shaft with an outer radial side of the intermediate shaft mounted to the second rotor to form a second splined connection, the first splined connection axially overlapping the second splined connection; and
   mounting a first rotor to the second rotor with the first rotor axially adjacent the second rotor.

11. The method of claim 10, further comprising threadably engaging a nut with the intermediate shaft to axially fix the first rotor between the nut and the second rotor with the nut disposed within a rotor bore defined radially inward of the first rotor.

12. The method of claim 10, wherein the intermediate shaft includes at least one bearing assembly mounted on the outer radial side of the intermediate shaft.

13. A rotor assembly for a gas turbine engine, the rotor assembly comprising:
   a turbine shaft disposed about a longitudinal axis;
   a first rotor configured for rotation about the longitudinal axis;
   a second rotor mounted to and axially adjacent the first rotor and configured for rotation about the longitudinal axis; and an intermediate shaft positioned radially between the turbine shaft and the second rotor, the intermediate shaft mounted to the turbine shaft on an inner radial side of the intermediate shaft and mounted to the second rotor on an outer radial side of the intermediate shaft;

wherein the turbine shaft and the intermediate shaft define a first splined connection comprising first external splines of the turbine shaft engaged with first internal splines of the intermediate shaft; wherein the intermediate shaft and the second rotor define a second splined connection comprising second external splines of the intermediate shaft engaged with second internal splines of the second rotor, and wherein the first splined connection axially overlaps the second splined connection.

14. The rotor assembly of claim 13, further comprising a nut threadably engaged with the intermediate shaft, wherein the first rotor contacts and is mounted between the nut and the second rotor.

15. The rotor assembly of claim 14, wherein the first rotor defines a rotor bore radially inward of the first rotor and the nut is disposed within the rotor bore.

16. The rotor assembly of claim 15, wherein the intermediate shaft includes at least one bearing assembly mounted on the outer radial side of the intermediate shaft.

17. The rotor assembly of claim 13, wherein each of the first rotor and the second rotor include at least one bladed disk.

* * * * *